United States Patent Office 2,985,219
Patented May 23, 1961

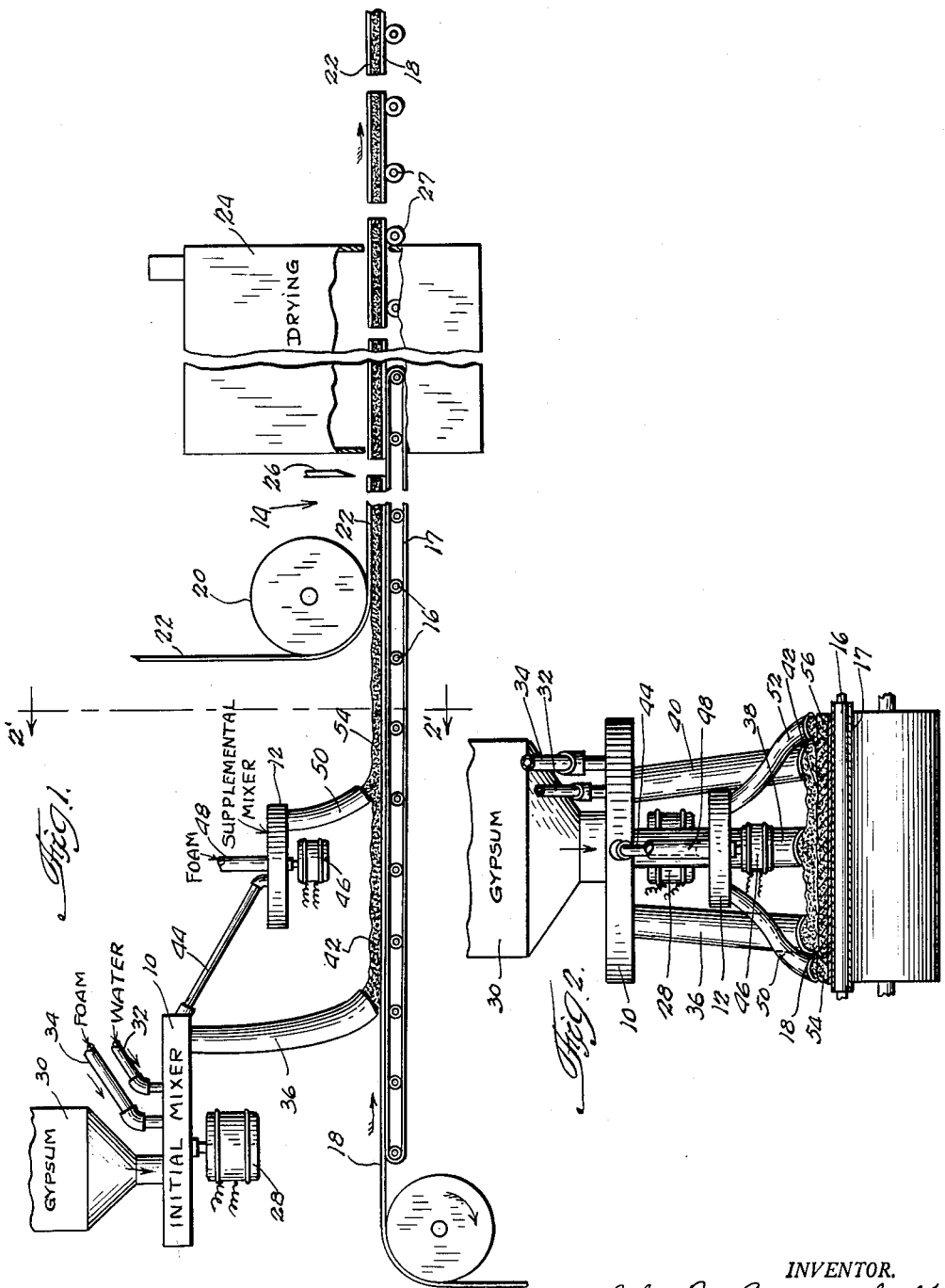

2,985,219
PROCESS AND APPARATUS FOR PRODUCING PLASTERBOARD
John M. Summerfield, Skokie, Ill., assignor to United States Gypsum Company, Chicago, Ill., a corporation of Illinois
Filed Dec. 29, 1958, Ser. No. 783,439
11 Claims. (Cl. 154—1)

This invention relates to a plasterboard and has for an object the provision of a process and apparatus for making plasterboard having improved properties.

Plasterboard at the present time is manufactured commercially by processes that are capable of operation under continuous high speed conditions. In these processes an aqueous slurry of calcined gypsum is continuously deposited on a moving sheet of paper which constitutes one cover for the final product. The slurry so deposited is leveled by a roller and a second cover sheet is simultaneously applied and one of the cover sheets may be folded over the edges of the unset slurry. The gypsum forming the core between the opposed sheets is then allowed to set and the resulting board is cut to a desired length and passed through a drying kiln in which the excess water is removed. One such machine for this purpose is disclosed in Utzman Patent No. 1,330,413, dated February 10, 1920. In the operation of high speed plasterboard machines of this type it is important that quick setting gypsum slurries be employed in order that production may be maintained at a suitable rate. Thus, as is well known, the calcined gypsum employed usually includes set accelerators so that the core of the board will be essentially completely set within a few minutes after the slurry has been formed. Thus in these operations the temperature rise set time of the gypsum slurry is usually less than about 15 minutes. A 15 minute temperature rise set time corresponds to an initial Gilmore set time of about 6 minutes. However, in commercial operations the time between the initial preparation of the slurry and the time that the second cover sheet is applied on the plasterboard machine must be considerably less than 6 minutes if the plasterboard machine is to operate properly. In other words, there must be no substantial set before the slurry and cover sheets are passed through the final forming roll on the plasterboard machine.

In the commercial manufacture of plasterboard it is usually desired that the product be of light weight and this result may be accomplished by incorporating a pregenerated tenacious foam directly into the gypsum and water slurry at the time that it is initially mixed. This is a procedure that is well known to the art and is disclosed in Roos Patent No. 2,017,022, dated October 8, 1935 and in Roos Patent No. 2,080,009, dated May 11, 1937. In accordance with the disclosures in these patents, a pregenerated tenacious foam is admixed with the calcined gypsum and water under conditions to form a foamed slurry and this slurry may be used for the manufacture of plasterboard to produce a product having a lightweight cellular core.

In the manufacture of lightweight plasterboard products of this general type, there were originally problems with respect to the mixers or blenders that could be used for forming the initial slurry. A number of different types of mixers have been suggested and certain of them are disclosed in Pfeffer et al. Patent No. 1,758,200, dated May 13, 1930, Turner et al. Patent No. 1,813,828, dated July 7, 1931, Knode Patent No. 2,220,683, dated November 5, 1940, Knode et al. Patent No. 2,220,684, dated November 5, 1940, and Camp Patent No. 2,253,059, dated August 19, 1941. In the selection and operation of these several slurry mixers or blenders there are a number of factors that must be taken into consideration. The foam, gypsum and water must be mixed or blended sufficiently so that a uniform product is obtained when the mixture is deposited as a slurry on the paper cover sheet. Also the mixing must be comparatively mild when the foam is present in order that the foam is not substantially destroyed during the mixing operation. Other items to be considered in the selection of mixers or blenders for this purpose include the tendency of the gypsum to set and build up within the mixer, the large volume of material that must be handled per unit of time in a high speed plasterboard manufacturing operation, the limited space available for the mixer or blender, the short length of time during which the material being mixed can stay in the plastic state, and the flash set that may be imparted to the slurry. Thus in commercial operations these machines must sometimes mix the slurry for the core material at the rate of about 1000 pounds per minute. This is a considerable quantity of material to process in a short period of time and in a relatively small space and the mixer or blender must operate continuously to provide a uniform slurry in a minimum mixing time without substantial foam breaking.

In the manufacture of lightweight plasterboards of the character indicated, the product is subjected to a drying operation in a kiln in order to remove any residual free water that may be left in the board. This kiln drying sometimes results in a weakening of the board at its edges due to the fact that some dehydration of the gypsum dihydrate may occur adjacent the edges due perhaps largely to the surface area exposed to the drying operation adjacent these edges. This phenomenon may be observed even though the raw edge of the core is covered by folded-over portions of the cover sheets as described in Patent No. 1,330,413.

Thus a characteristic of certain of the lightweight plasterboards produced in the prior art is that they may have a tendency to be weak adjacent their edge portions. It has been recognized that it is desirable to strengthen these portions of the board if at all possible. Such strengthening will tend to prevent the edges of the boards from becoming damaged during rough handling and will also permit such boards to be nailed closer to the edges than might otherwise be possible. One method that has been proposed for strengthening the edges of the boards is suggested in Brookby Patent No. 1,489,693, dated April 8, 1924. In this patent a process is disclosed which involves depositing a separate gypsum slurry along the edges of the main slurry stream that is passed into the plasterboard machine. These separate streams comprise a gypsum slurry to which a hardening agent such as a gummy colloid has been added. The product resulting from such a process is not always entirely satisfactory, however, because the edges having a high percentage of gummy material may show an excessive sensitivity to water. Also the process specifically disclosed in the Brookby patent is not adaptable to high speed operations in an economical manner.

Another method that has been suggested for protecting the edges of plasterboard is that disclosed in Teale Patent No. 2,762,738, issued September 11, 1956. By this proposed process it is claimed that reinforced edges are provided by depositing an unfoamed slurry along the edges of the foamed slurry prior to the time that the second cover sheet is applied and prior to the final forming operation on the plasterboard machine. The unfoamed slurry at the edges is relatively dense and is said to protect the plasterboard against accidental breakage at the edges.

The difficulty with the product prepared in accordance with this process is that the density of the core adjacent the edge is considerably greater than the center core density. This results in a product which may have a variation in properties when it is nailed to a wall which may result in ridging. The high density edge core portion lacks resistance to mechanical shock and has a tendency to shatter when nails are driven through it. Also such boards have a plane of weakness at the juncture between the low density central core and the high density edge core.

Accordingly, a further object of this invention is to provide a plasterboard product having enhanced strength and hardness adjacent at least one edge thereof.

A further object of this invention is to provide a process and apparatus which is useful for the preparation of high strength lightweight plasterboards.

A still further object of this invention is to provide a process and apparatus for producing a plasterboard having an edge portion which is stronger than the field portion of the board.

An additional object of this invention is the provision of a process and apparatus for producing a hard edge plasterboard in which the densities of the edge portion of the core and of the central portion of the core are essentially the same and in which supplemental core-hardening or strengthening agents adjacent the edges are unnecessary.

A still further object of this invention is the provision of a process and apparatus for producing plasterboard which is particularly adaptable for high speed production on present commercial machines.

A still further object of this invention is the provision of a process and apparatus for making plasterboard which is readily adaptable to present day commercial machines and methods.

A still further object of this invention is the provision of a process and apparatus for making a plasterboard which may be dried under adverse drying conditions.

Further and additional objects will appear from the following description, the accompanying drawing and the appended claims.

In accordance with one embodiment of this invention, a process and apparatus are provided in which a foamed gypsum slurry is prepared by conventional techniques under relatively mild conditions of blending or mixing such that the foam is not broken to any substantial extent during the operation. Thereafter at least a portion of the resulting slurry is intensely or violently mixed under conditions such that a substantial portion of the foam in the slurry is broken. During this supplemental mixing, additional foam is added to the mixer to replace at least a portion of the foam that is broken in the supplemental mixing operation. The foamed slurry discharged from the supplemental mixer is deposited on the moving support of a conventional plasterboard machine whereafter it is formed by the roller and passed through the conventional setting, cutting and drying zones.

The invention is particularly useful in commercial operations wherein the temperature rise set time of the gypsum slurry is less than about 15 minutes, suitably between 4 and 12 minutes, and wherein a lightweight plasterboard product is formed having a dry core denisty of between about 35 and 60 pounds per cubic foot.

The process and apparatus of this invention are particularly useful in the production of a hard edge board and in such an operation only the slury forming the edge core portions of the board is subjected to the supplementary intense mixing, and the central portion of the board core is formed from a slurry discharged from the conventional initial mixer. By this process the product of this invention is formed. In this product the central core and edge core densities are essentially the same but the edge core has an enhanced strength and hardness which tend to prevent edge damage during handling and permit nailing the board near the edges without shattering.

For a more complete understanding of this invention reference will now be made to the accompanying drawing, wherein Fig. 1 is a diagrammatic side elevational view of an apparatus constructed in accordance with one embodiment of this invention; and Fig. 2 is a sectional view taken along the line 2'—2' of Fig. 1.

Referring more particularly to the drawings, the apparatus for carrying out the process of this invention comprises an initial mixer 10, a supplemental mixer 12 and a conventional plasterboard-forming machine 14. The plasterboard-forming machine includes a series of rollers 16 for supporting and moving a continuous belt 17 and a paper cover 18 through the plasterboard machine. The machine also includes a forming roll 20 over which a cover 22 is passed to provide the upper cover for the formed plasterboard. The roll 20 cooperates with the belt 17 and one of the rollers 16 to flatten the gypsum slurry on the cover sheet 18. The machine 14 includes a conventional cutting device 26 in order to sever the set formed plasterboard into the desired lengths and a conventional hot air drying chamber 24 through which hot air is circulated at elevated temperatures between 200° and 700° F., preferably between 350° and 650° F. Rollers 27 are provided to convey the plasterboard from the chamber 24 to storage.

The initial mixer 10 is driven by a suitable motor 28 and is provided with inlet means 30, 32 and 34 for calcined gypsum, water and pregenerated foam, respectively. The calcined gypsum may have suitable set-accelerators, fibers or other ingredients incorporated therein, all as is well known to the art. The initial mixer includes three discharge conduits 36, 38 and 40 for depositing a first foamed slurry 42 onto a central portion of the surface of the cover sheet 18. While three conduits 36, 38 and 40 are shown, it will, of course, be apparent that one or more conduits may be suitably used for this purpose.

Also extending from the discharge end of the initial mixer 10 is an effluent or outlet conduit 44 which supplies slurry mixed in the mixer 10 to the supplemental mixer 12. This supplemental mixer is driven by a motor 46 and is provided with a conduit 48 for introducing a pregenerated tenacious foam along with the foamed slurry supplied from conduit 44. The foam supplied through conduits 34 and 48 may originate at a common source (not shown) which may comprise any type of foam generator. These are well known in this art. The supplemental mixer 12 is also provided with a pair of effluent conduits 50 and 52 through which side streams 54 and 56 of slurry are deposited along opposite edges of the central stream 42 to form the edge cores of the final board product.

The initial mixer 10 is a conventional mixer that is well known in the art for preparing a slurry of gypsum, water and a pregenerated tenacious foam. Suitable mixers are those disclosed in the above referred to Patents Nos. 1,758,200, 1,813,828, 2,220,683, 2,220,684 or 2,253,059. Also other conventional mixers may be used. However, in the operation of the initial mixer the condition of mixing should be such that the gypsum, water and foam are thoroughly blended but the mixing should be relatively mild so that no substantial amounts of foam are broken during the mixing operation. This is conventional procedure in an initial mixer since if large amounts of foam are broken, then a desired lightweight product is not produced. By the terms "under substantial nonfoam-breaking conditions," "without substantial breakage of foam" and the like as used in this specification and the claims, it is intended to mean that the mixing in the initial mixer is effected under conditions such that less than about 15 percent of the foam is broken during the initial mixing operation. This percentage may be calculated from the relative volumes and weights of the materials charged to and discharged from the initial mixer.

Likewise the supplemental mixer 12 may be of any desired conventional type so long as the mixing in the mixer is carried out violently or intensely under conditions such that a substantial amount of foam initially present in the slurry passed through conduit 44 is broken. Thus by the terms "under substantial foam-breaking conditions," "with substantial breakage of foam" and the like as used herein, it is intended to mean mixing operations in which in excess of about 25 percent of the foam present in the slurry introduced into the supplemental mixer is destroyed if no replacement foam is added through the inlet 48 as herein described. It will be obvious that these percentages may also be readily calculated.

Thus the mixing in the supplemental mixer is considerably more intense than the mixing in the initial mixer and the mixing in the supplemental mixer is done under substantially foam-breaking conditions while the mixing in the initial mixer is done under substantially nonfoam-breaking conditions. As indicated, the supplemental mixer may take various physical forms but mixers that have been found to be particularly useful in operations of this type are the pin mixers disclosed in the above referred to Patents Nos. 1,758,200 or 2,253,059. The initial mixer is ordinarily operated in commercial operations at rotational speeds of 300 to 400 r.p.m., while the rotational speeds of the supplemental mixer in accordance with this invention are on the order of 1000 r.p.m. or more.

It has been found when a foamed gypsum slurry is subjected to the violent or intense mixing in the supplemental mixer, a slurry is produced which will set to a product having a strength which is as much as 10 to 20 percent greater than the strength of the set slurry which is discharged from the primary mixer under the conditions above defined. Also a very considerable portion of this strength differential is still retained when additional foam is added to the supplemental mixer. In preparing a product in accordance with this invention it is preferred that the dry set density of the edge slurry 54 and 56 should be less than 1.05 times the dry set density of the central slurry 42. Thus a marked density differential between the edge core and the central core of the final product is avoided by the use of the process and apparatus of this invention, but at the same time a final product is produced which has an increased hardness and strength at the edges so that the product may be nailed near the edges. Also the edges have a decreased tendency to break when roughly handled.

In accordance with one embodiment of this invention, calcined gypsum accelerated to have a slurry temperature rise set time of about seven minutes is continuously introduced into the conventional initial mixer 10 from hopper 30 at the rate of about 578 pounds per minute. Simultaneously water is added through conduit 32 to the initial mixer at the rate of about 339 pounds per minute and a pregenerated tenacious foam having a density of about 16.4 pounds per cubic foot is introduced into the initial mixer at the rate of about 88 pounds per minute. The foam may be pregenerated by any means that is well known to the art and includes a foamed dispersion of water and a foaming agent such as a rosin soap. A cereal grain binding agent is added with the calcined gypsum at the rate of about 3.5 pounds per minute and cellulose fibers at the rate of about 7.0 pounds per minute. The ingredients are then mixed in the initial mixer to thoroughly blend the gypsum, pregenerated foam, water and other additives but the mixing is mild so that a substantial amount of the foam remains unbroken. The major portion of the foamed slurry is discharged at the rate of about 929 pounds per minute from the initial mixer through conduits 36, 38 and 40 onto the surface of the cover sheet 18 which is moving at the rate of about 89 feet per minute. This slurry 42 forms the central core of the ultimate plasterboard product and has a temperature rise set time of about 7 minutes and a dry set density of about 49.3 pounds per cubic foot.

A side stream is withdrawn from the effluent of the initial mixer 10 through conduit 44 and introduced into the supplemental mixer at the rate of about 86 pounds of foamed slurry per minute. In the supplemental mixer an intense mixing of this slurry occurs which is more violent than the mixing afforded by the initial mixer. The intensity of the mixing in the supplemental mixer is difficult to define accurately because of the various types of supplemental mixers that may be employed in this stage of the process. However, it can be said that the mixing is sufficiently intense so that when operated normally a substantial amount of foam breaking will occur in the mixer. Thus in this specific example a substantial amount of the foam present in the slurry initially fed to the supplemental mixer through conduit 44 is broken in the supplemental mixer and additional foam having a density of about 16.4 pounds per cubic foot is added at the rate of about 9 pounds per minute through conduit 48 in order to replace the broken foam so that the slurry 54 and 56 discharged from the supplemental mixer through conduits 50 and 52 has a dry set density which is essentially the same as the dry set density of the slurry 42 discharged from the initial mixer. The intensely mixed slurry from the supplemental mixer is discharged from each of conduits 50 and 52 at the rate of about 47.5 pounds per minute onto the moving cover sheet 18 alongside the edges of the central slurry stream 42 and the composite assembly is then passed under roller 20 at which time the cover sheet 22 is applied in accordance with conventional procedures and the slurry is leveled to a thickness of ½ inch. It will, of course, be appreciated that the edges of the board may be covered by folding, if desired, in accordance with the procedure set forth in the above referred to Patent No. 1,330,413. In this process the width of the central core is 44 inches and the width of each edge core is 2 inches.

Thereafter the composite assembly is allowed to set, cut to desired lengths and continuously passed through the high temperature drying zone to remove any excess water that is not consumed in the hydration of the gypsum. Upon emerging from the drying zone 24 the product is passed to storage for ultimate use.

In this specific example the dry set density of the central core was about 49.3 pounds per cubic foot, and the dry set density of the opposite edges was about 49.5 pounds per cubic foot. The hardness of the edge portion of the board (measured at a point along the hardened edge face one inch from the corner of the board after passing through the drying chamber) prepared in the manner described herein was measured to be about 25.0 pounds, while the hardness of the corresponding edge portion of a board prepared in the conventional manner (supplemental mixing step omitted) was measured to be about 14.5 pounds. Hardness was determined by measuring with a spring-loaded force indicator the force required for a specific needle to penetrate $5/16''$ into the board. The compressive strength of the set gypsum forming the edge portion of board prepared in the manner described herein was measured to be 945 pounds per square inch while the compressive strength of the set gypsum forming the edge portions of board prepared in the conventional manner was 815 pounds per square inch.

Thus it will be apparent that a product has been formed having a monolithic core which has an edge hardness and strength which permits nailing of the product near the edges and which permits the boards to be roughly handled without damage. At the same time the composition and density of the edge core and the central core of the board are essentially the same and there are no variations in the appearance and thickness of the board.

The reasons for the increased dry set hardness and strength of the slurry emerging from the supplemental mixer even with the addition foam added to maintain the same density is not fully understood. In a sense the teachings of this invention fly in the face of the prior art which emphasizes that the mixing of the slurry should be comparatively mild so as to prevent substantial breakage of the foam in the mixer. This is, of course, desirable for economic reasons in order to save on the amount of foam used. However, by this process it has been found that intense mixing of at least a portion of the slurry formed in the initial mixer is desirable to form a set edge core of increased strength. At the same time additional foam is added in order to restore the density of the edge slurry to a value which approximates the dry set density of the slurry introduced into the supplemental mixer thereby resulting in a product having a uniform density.

The invention has been described with reference to a plasterboard machine in which a single board slab is continuously formed. However, it is readily adaptable to machines for simultaneously forming a plurality of board slabs and the outlets for the initial and/or supplemental mixers may correspond to the number of streams deposited on the machine, all as will be apparent to one skilled in the art.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. A process of producing a hard edge plasterboard which comprises mixing in a first mixing zone calcined gypsum, a tenacious foam and water under conditions whereby said ingredients are thoroughly blended and said foam remains substantially unbroken, discharging a major portion of the resulting foamed slurry from the first mixing zone onto a moving cover sheet, discharging a minor portion of said foamed slurry from the first mixing zone to a second and separate mixing zone, intensely mixing said minor portion of said slurry in said second mixing zone under foam-breaking conditions, adding a separate stream of tenacious foam to said second mixing zone to replace at least a portion of the foam broken in said second mixing zone, discharging the foamed slurry from said second mixing zone onto said cover sheet along an edge of said first deposited slurry, applying a second cover sheet to the composite assembly and passing the assembly to a gypsum setting and drying zone.

2. A process of producing a hard edge plasterboard which comprises continuously introducing streams of calcined gypsum, water and a pregenerated tenacious foam into a first mixing zone whereby to form a foamed gypsum slurry, the mixing in said first mixing zone being of substantially nonfoam-breaking intensity, continuously depositing a major portion of the foamed slurry directly from said first mixing zone onto a moving surface, continuously withdrawing a minor portion of the foamed slurry directly from said first mixing zone and passing it in a stream to a second mixing zone, the mixing in said second mixing zone being of substantial foam-breaking intensity, continuously adding a separate stream of pregenerated foam to said second mixing zone to replace at least a portion of the foam broken in said second mixing zone, continuously discharging slurry in separate streams from said second mixing zone onto said moving surface alongside and contiguous with opposite side edges thereof, forming the composite streams into a flattened sheet prior to setting of the slurry, and passing the sheet to a gypsum setting and drying zone.

3. In a process of preparing plasterboard the steps of continuously mixing gypsum, water and a pregenerated tenacious foam under conditions sufficient to produce a settable slurry but insufficient to break a substantial amount of said foam therein, passing at least a portion of said settable slurry to an independent and separate mixing zone, mixing said slurry in said last mentioned zone at an intensity sufficient to break at least a portion of the foam in said slurry, passing additional pregenerated foam into said separate mixing zone to replace at least a portion of the foam broken therein by said mixing, discharging the foamed slurry from the separate mixing zone onto a moving surface in the form of a sheet, and passing said sheet to a gypsum setting and drying zone.

4. The process recited in claim 3 wherein said gypsum is of the quick setting type and said slurries have a temperature rise set time of less than about fifteen minutes.

5. A process of producing hard edge plasterboard which comprises passing separate streams of a fast setting calcined gypsum, a pregenerated tenacious foam and water to a first mixing zone, continuously mixing said streams under mild conditions sufficient to mix the ingredients but insufficient to break a substantial proportion of the foam therein, the resulting slurry having a temperature rise set time of less than about fifteen minutes, depositing a first portion of the effluent from said first mixing zone onto a moving surface as a central stream, passing a second portion of the effluent from said first mixing zone into a second separate mixing zone, mixing said second portion in said second mixing zone under intense conditions sufficient to break a substantial portion of the foam present therein, passing a stream of pregenerated tenacious foam into said second mixing zone at least partially to replace the foam broken therein, depositing the effluent from the second mixing zone onto said moving surface alongside said central stream, leveling the combined streams on said moving surface to form a flat slab, and drying said slab to produce a monolithic core having opposite edges of greater hardness than the central portion thereof.

6. A process of producing hard edge lightweight plasterboard which comprises continuously forming a foamed slurry of calcined gypsum and water, said slurry having a temperature rise set time of less than about fifteen minutes and containing foam sufficient to form a set mass when dry having a density of between about 35 and 60 pounds per cubic foot, continuously depositing a major portion of said slurry as a central stream onto a moving cover sheet, continuously passing a minor portion of said slurry to an intense mixing zone, mixing said slurry in said zone under conditions sufficiently intense to break at least a portion of the foam in said slurry, continuously adding a pregenerated foam to said intense mixing zone to replace at least a portion of the foam broken therein by said mixing, continuously depositing a stream of slurry from said mixing zone onto said cover sheet alongside said central stream, applying a second cover sheet over the combined streams and leveling the composite assembly, and passing said assembly to a gypsum setting and drying zone whereby to produce said plasterboard.

7. The process recited in claim 6 wherein the dry set density of the side stream slurry is less than 1.05 times the dry set density of the central stream slurry.

8. In a process for preparing plasterboard including the steps of blending in an initial mixer a mixture of calcined gypsum, water and a tenacious foam under substantially non-foam-breaking conditions, depositing the blended mixture onto a moving cover sheet, permitting said deposited mixture to set in the form of a slab and drying the set slab at an elevated temperature, the improvement which comprises the steps of withdrawing a side stream of said mixture from said initial mixer prior to depositing of said cover sheet, violently mixing said side stream in a supplemental mixer under substantially foam-breaking conditions, adding a separate quantity of tenacious foam to said supplemental mixer to replace at least a portion of the foam broken in said supplemental mixer, and discharging the mixture from said supplemental mixer onto said moving cover sheet alongside and contiguous with the mixture deposited thereon from said initial mixer prior to setting thereof.

9. An apparatus for producing gypsum board comprising a low intensity initial mixer having means for receiving calcined gypsum, water and foam to be blended therein and first effluent means for the resulting slurry attached to said initial mixer; a separate independent high intensity supplemental mixer having means for receiving pregenerated foam and second effluent means for the resulting slurry attached to said supplemental mixer; conduit means connecting said first effluent means and said supplemental mixer; means for supporting a plasterboard liner constituting a part of a plasterboard foaming machine; and means communicating between said second effluent means and said means for supporting a plasterboard liner whereby slurry from said supplemental mixer is passed onto said liner.

10. An apparatus for producing gypsum board comprising a low intensity initial mixer having a first inlet means for receiving calcined gypsum, water and pregenerated foam and said initial mixture also having a first outlet means for the foamed slurry mixed therein; a high intensity supplemental mixer, said mixer having a second inlet means communicating with said first outlet means of said initial mixer, said supplemental mixer also, having a third inlet means for pregenerated foam and said supplemental mixer also having a second outlet means for the foamed slurry mixed therein; means for supporting a moving plasterboard liner constituting a part of a plasterboard forming machine; means communicating with said first outlet means of said initial mixer for discharging mixed slurry from said initial mixer onto one area of said moving liner; and means communicating with said second outlet means of said supplemental mixer for discharging mixed slurry from said supplemental mixer onto another adjacent area of said moving liner.

11. In a plasterboard machine having a low intensity initial mixer for mixing calcined gypsum, water and tenacious foam under substantially non-foam-breaking conditions, means for discharging the resulting mixture in the form of a stream onto a moving support, means for leveling said stream to form a continuously moving slab, and a setting zone and a drying zone for said slab, the improvement which comprises a high intensity supplemental mixer for mixing a portion of said first mentioned mixture under substantially foam-breaking conditions, means for introducing additional tenacious foam into said supplemental mixer to replace at least a portion of the foam broken therein, and means for discharging a supplemental stream of foamed gypsum slurry from said supplemental mixer onto said support alongside and contiguous with said first mentioned stream ahead of said leveling means.

References Cited in the file of this patent

UNITED STATES PATENTS

| | | |
|---|---|---|
| 1,992,208 | Harrison | Feb. 26, 1935 |
| 2,762,738 | Teale | Sept. 11, 1956 |

UNITED STATES PATENT OFFICE
CERTIFICATE OF CORRECTION

Patent No. 2,985,219                          May 23, 1961

John M. Summerfield

It is hereby certified that error appears in the above numbered patent requiring correction and that the said Letters Patent should read as corrected below.

Column 3, line 63, for "denisty" read -- density --; line 67, for "slury" read -- slurry --; column 7, line 2, for "addition" read -- additional --; column 8, line 68, for "of" read -- on --; column 9, line 20, for "mixture" read -- mixer --.

Signed and sealed this 17th day of October 1961.

(SEAL)
Attest:

ERNEST W. SWIDER
Attesting Officer

DAVID L. LADD
Commissioner of Patents
USCOMM-DC